US011361522B2

(12) United States Patent
Kaifosh et al.

(10) Patent No.: US 11,361,522 B2
(45) Date of Patent: *Jun. 14, 2022

(54) USER-CONTROLLED TUNING OF HANDSTATE REPRESENTATION MODEL PARAMETERS

(71) Applicant: Facebook Technologies, LLC, Menlo Park, CA (US)

(72) Inventors: Patrick Kaifosh, New York, NY (US); Adam Berenzweig, Brooklyn, NY (US); Adam Al-natsheh, New York, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,029

(22) Filed: Oct. 18, 2019

(65) Prior Publication Data
US 2020/0118350 A1 Apr. 16, 2020

Related U.S. Application Data

(63) Continuation of application No. 16/258,409, filed on Jan. 25, 2019, now Pat. No. 10,489,986.
(Continued)

(51) Int. Cl.
*G06F 3/01* (2006.01)
*G06T 19/20* (2011.01)
(Continued)

(52) U.S. Cl.
CPC .............. *G06T 19/20* (2013.01); *G06F 1/163* (2013.01); *G06F 3/011* (2013.01); *G06F 3/014* (2013.01);
(Continued)

(58) Field of Classification Search
None
See application file for complete search history.

(56) References Cited

U.S. PATENT DOCUMENTS

| 4,896,120 A | 1/1990 | Kamil |
| 5,625,577 A | 4/1997 | Kunii et al. |
| (Continued) | | |

FOREIGN PATENT DOCUMENTS

| CA | 2 902 045 A1 | 8/2014 |
| CA | 2 921 954 A1 | 2/2015 |
| (Continued) | | |

OTHER PUBLICATIONS

Sartori, Massimo, David G. Llyod, and Dario Farina. "Neural data-driven musculoskeletal modeling for personalized neurorehabilitation technologies." IEEE transactions on biomedical engineering 63.5, 2016: 879-893.*

(Continued)

*Primary Examiner* — Sultana M Zalalee
(74) *Attorney, Agent, or Firm* — FisherBroyles, LLP

(57) ABSTRACT

Methods and apparatus for enabling a user or third-party to select or adjust parameters of one or more statistical models used to generate a musculoskeletal representation. The method comprises providing as input to the statistical model (s), a plurality of neuromuscular signals recorded by a plurality of neuromuscular sensors during performance of at least one gesture by a user, wherein the at least one gesture is performed by the user while wearing a wearable device having the plurality of neuromuscular sensors arranged thereon, rendering at least one visual representation based on an output of the statistical model(s), and receiving user or third-party input to adjust parameters of the statistical model (s) based on the rendered at least one visual representation, the user input including a selection of a particular statistical (Continued)

model of the statistical model(s) and/or an adjustment of parameters associated with the particular statistical model.

30 Claims, 6 Drawing Sheets

Related U.S. Application Data

(60) Provisional application No. 62/621,770, filed on Jan. 25, 2018.

(51) Int. Cl.
*G06T 15/00* (2011.01)
*G06N 7/00* (2006.01)
*G06N 20/10* (2019.01)
*G06F 1/16* (2006.01)

(52) U.S. Cl.
CPC .............. *G06F 3/015* (2013.01); *G06F 3/017* (2013.01); *G06N 7/005* (2013.01); *G06N 20/10* (2019.01); *G06T 15/005* (2013.01); *G06T 2219/2021* (2013.01)

(56) References Cited

U.S. PATENT DOCUMENTS

| | | | |
|---|---|---|---|
| 6,005,548 A | 12/1999 | Latypov et al. | |
| 6,009,210 A | 12/1999 | Kand | |
| 6,066,794 A * | 5/2000 | Longo | G10H 1/02 84/600 |
| 6,244,873 B1 | 6/2001 | Hill et al. | |
| 6,411,843 B1 | 6/2002 | Zarychta | |
| 6,658,287 B1 | 12/2003 | Litt et al. | |
| 6,720,984 B1 | 4/2004 | Jorgensen et al. | |
| 6,774,885 B1 * | 8/2004 | Even-Zohar | A61B 5/1036 345/156 |
| 6,942,621 B2 | 9/2005 | Avinash et al. | |
| 7,089,148 B1 | 8/2006 | Bachmann et al. | |
| 7,351,975 B2 | 4/2008 | Brady et al. | |
| 7,574,253 B2 | 8/2009 | Edney et al. | |
| 7,580,742 B2 | 8/2009 | Tan et al. | |
| 7,787,946 B2 | 8/2010 | Stahmann et al. | |
| 7,805,386 B2 | 9/2010 | Greer | |
| 7,901,368 B2 | 3/2011 | Flaherty et al. | |
| 8,170,656 B2 | 5/2012 | Tan et al. | |
| 8,190,249 B1 | 5/2012 | Gharieb et al. | |
| 8,311,623 B2 | 11/2012 | Sanger | |
| 8,351,651 B2 | 1/2013 | Lee | |
| 8,421,634 B2 | 4/2013 | Tan et al. | |
| 8,435,191 B2 | 5/2013 | Barboutis et al. | |
| 8,437,844 B2 | 5/2013 | Syed Momen et al. | |
| 8,447,704 B2 | 5/2013 | Tan et al. | |
| 8,484,022 B1 | 7/2013 | Vanhoucke | |
| 8,718,980 B2 | 5/2014 | Garudadri et al. | |
| 8,744,543 B2 | 6/2014 | Li et al. | |
| 8,754,862 B2 | 6/2014 | Zaliva | |
| 8,880,163 B2 | 11/2014 | Barachant et al. | |
| 8,890,875 B2 | 11/2014 | Jammes et al. | |
| 8,892,479 B2 | 11/2014 | Tan et al. | |
| 9,037,530 B2 | 5/2015 | Tan et al. | |
| 9,218,574 B2 | 12/2015 | Phillipps et al. | |
| 9,235,934 B2 | 1/2016 | Mandella et al. | |
| 9,240,069 B1 | 1/2016 | Li | |
| 9,278,453 B2 | 3/2016 | Assad | |
| 9,299,248 B2 | 3/2016 | Lake et al. | |
| 9,367,139 B2 | 6/2016 | Ataee et al. | |
| 9,372,535 B2 | 6/2016 | Bailey et al. | |
| 9,389,694 B2 | 7/2016 | Ataee et al. | |
| 9,408,316 B2 | 8/2016 | Bailey et al. | |
| 9,459,697 B2 | 10/2016 | Bedikian et al. | |
| 9,483,123 B2 | 11/2016 | Aleem et al. | |
| 9,597,015 B2 | 3/2017 | McNames et al. | |
| 9,600,030 B2 | 3/2017 | Bailey et al. | |
| 9,612,661 B2 | 4/2017 | Wagner et al. | |
| 9,613,262 B2 | 4/2017 | Holz | |
| 9,659,403 B1 | 5/2017 | Horowitz | |
| 9,687,168 B2 | 6/2017 | John | |
| 9,696,795 B2 | 7/2017 | Marcolina et al. | |
| 9,720,515 B2 | 8/2017 | Wagner et al. | |
| 9,741,169 B1 | 8/2017 | Holz | |
| 9,766,709 B2 | 9/2017 | Holz | |
| 9,785,247 B1 | 10/2017 | Horowitz et al. | |
| 9,788,789 B2 | 10/2017 | Bailey | |
| 9,864,431 B2 | 1/2018 | Keskin et al. | |
| 9,867,548 B2 | 1/2018 | Le et al. | |
| 9,880,632 B2 | 1/2018 | Ataee et al. | |
| 9,891,718 B2 | 2/2018 | Connor | |
| 10,042,422 B2 | 8/2018 | Morun et al. | |
| 10,070,799 B2 | 9/2018 | Ang et al. | |
| 10,101,809 B2 | 10/2018 | Morun et al. | |
| 10,152,082 B2 | 12/2018 | Bailey | |
| 10,188,309 B2 | 1/2019 | Morun et al. | |
| 10,199,008 B2 | 2/2019 | Aleem et al. | |
| 10,203,751 B2 | 2/2019 | Keskin et al. | |
| 10,216,274 B2 | 2/2019 | Chapeskie et al. | |
| 10,489,986 B2 * | 11/2019 | Kaifosh | G06T 15/005 |
| 10,676,083 B1 * | 6/2020 | De Sapio | B60W 30/09 |
| 2003/0144829 A1 | 7/2003 | Geatz et al. | |
| 2003/0171921 A1 | 9/2003 | Manabe et al. | |
| 2003/0184544 A1 | 10/2003 | Prudent | |
| 2004/0092839 A1 | 5/2004 | Shin et al. | |
| 2007/0172797 A1 * | 7/2007 | Hada | G09B 23/32 434/1 |
| 2007/0256494 A1 | 11/2007 | Nakamura et al. | |
| 2007/0285399 A1 * | 12/2007 | Lund | G06F 3/04883 345/173 |
| 2008/0052643 A1 * | 2/2008 | Ike | G06F 3/017 715/863 |
| 2008/0214360 A1 | 9/2008 | Stiding et al. | |
| 2008/0221487 A1 * | 9/2008 | Zohar | A61B 5/103 600/595 |
| 2009/0082692 A1 | 3/2009 | Hale et al. | |
| 2009/0082701 A1 | 3/2009 | Zohar et al. | |
| 2009/0112080 A1 | 4/2009 | Matthews | |
| 2009/0326406 A1 | 12/2009 | Tan et al. | |
| 2009/0327171 A1 * | 12/2009 | Tan | G06F 3/015 706/12 |
| 2010/0030532 A1 | 2/2010 | Arora et al. | |
| 2010/0063794 A1 | 3/2010 | Hernandez-Rebollar | |
| 2010/0106044 A1 | 4/2010 | Linderman | |
| 2010/0280628 A1 | 11/2010 | Sankai | |
| 2010/0292617 A1 * | 11/2010 | Lei | A61B 5/1107 600/595 |
| 2010/0293115 A1 * | 11/2010 | Seyed Momen | A61B 5/04888 706/12 |
| 2010/0306713 A1 * | 12/2010 | Geisner | G06F 3/04847 715/863 |
| 2010/0315266 A1 | 12/2010 | Gunawardana et al. | |
| 2011/0077484 A1 | 3/2011 | Van Slyke et al. | |
| 2011/0092826 A1 | 4/2011 | Lee et al. | |
| 2011/0119216 A1 * | 5/2011 | Wigdor | G06F 3/017 706/46 |
| 2012/0066163 A1 | 3/2012 | Balls et al. | |
| 2012/0188158 A1 | 7/2012 | Tan et al. | |
| 2012/0265480 A1 | 10/2012 | Oshima | |
| 2012/0283526 A1 | 11/2012 | Gommesen et al. | |
| 2013/0077820 A1 | 3/2013 | Marais et al. | |
| 2013/0106686 A1 * | 5/2013 | Bennett | G06F 3/017 345/156 |
| 2013/0141375 A1 * | 6/2013 | Ludwig | G06F 3/0488 345/173 |
| 2013/0207889 A1 * | 8/2013 | Chang | A61B 5/0002 345/156 |
| 2013/0217998 A1 | 8/2013 | Mahfouz et al. | |
| 2013/0232095 A1 | 9/2013 | Tan et al. | |
| 2013/0259238 A1 * | 10/2013 | Xiang | H04R 3/005 381/17 |
| 2013/0310979 A1 * | 11/2013 | Herr | B62D 57/032 700/258 |
| 2013/0317382 A1 | 11/2013 | Le | |
| 2013/0317648 A1 | 11/2013 | Assad | |
| 2014/0052150 A1 | 2/2014 | Taylor et al. | |

(56) References Cited

U.S. PATENT DOCUMENTS

| | | |
|---|---|---|
| 2014/0092009 A1 | 4/2014 | Yen et al. |
| 2014/0098018 A1 | 4/2014 | Kim et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0223462 A1 | 8/2014 | Aimone et al. |
| 2014/0240103 A1 | 8/2014 | Lake et al. |
| 2014/0240223 A1* | 8/2014 | Lake .............. G08C 17/02 345/156 |
| 2014/0245200 A1 | 8/2014 | Holz |
| 2014/0249397 A1 | 9/2014 | Lake et al. |
| 2014/0278441 A1 | 9/2014 | Ton et al. |
| 2014/0304665 A1* | 10/2014 | Holz .............. G06F 3/017 715/863 |
| 2014/0334083 A1 | 11/2014 | Bailey |
| 2014/0344731 A1 | 11/2014 | Holz |
| 2014/0355825 A1* | 12/2014 | Kim .............. G06K 9/00342 382/103 |
| 2014/0365163 A1 | 12/2014 | Jallon |
| 2014/0376773 A1 | 12/2014 | Holz |
| 2015/0006120 A1* | 1/2015 | Sett .............. G06F 30/23 703/2 |
| 2015/0010203 A1* | 1/2015 | Muninder .......... G06K 9/00288 382/103 |
| 2015/0025355 A1 | 1/2015 | Bailey et al. |
| 2015/0029092 A1 | 1/2015 | Holz et al. |
| 2015/0035827 A1* | 2/2015 | Yamaoka .......... G09B 19/0038 345/420 |
| 2015/0045699 A1* | 2/2015 | Mokaya .............. A61B 5/0024 600/595 |
| 2015/0051470 A1 | 2/2015 | Bailey et al. |
| 2015/0057770 A1 | 2/2015 | Bailey et al. |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0109202 A1 | 4/2015 | Ataee et al. |
| 2015/0124566 A1 | 5/2015 | Lake et al. |
| 2015/0128094 A1* | 5/2015 | Baldwin .............. G06F 3/017 715/863 |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0169074 A1 | 6/2015 | Ataee et al. |
| 2015/0193949 A1 | 7/2015 | Katz et al. |
| 2015/0234426 A1 | 8/2015 | Bailey et al. |
| 2015/0261306 A1 | 9/2015 | Lake |
| 2015/0261318 A1* | 9/2015 | Scavezze .............. G06F 3/0346 345/158 |
| 2015/0277575 A1 | 10/2015 | Ataee et al. |
| 2015/0302168 A1* | 10/2015 | De Sapio .............. G16Z 99/00 703/11 |
| 2015/0309563 A1 | 10/2015 | Connor |
| 2015/0309582 A1 | 10/2015 | Gupta |
| 2015/0313496 A1 | 11/2015 | Connor |
| 2015/0325202 A1 | 11/2015 | Lake et al. |
| 2015/0346701 A1 | 12/2015 | Gordon et al. |
| 2015/0355716 A1* | 12/2015 | Balasubramanian ........................ G06F 3/04883 345/173 |
| 2015/0370326 A1 | 12/2015 | Chapeskie et al. |
| 2015/0370333 A1 | 12/2015 | Ataee et al. |
| 2016/0011668 A1* | 1/2016 | Gilad-Bachrach ...... G06F 3/017 345/156 |
| 2016/0162604 A1 | 6/2016 | Xioli et al. |
| 2016/0187992 A1* | 6/2016 | Yamamoto .............. G06F 3/017 345/156 |
| 2016/0235323 A1 | 8/2016 | Tadi et al. |
| 2016/0262687 A1 | 9/2016 | Imperial |
| 2016/0274758 A1 | 9/2016 | Bailey |
| 2016/0292497 A1 | 10/2016 | Kehtarnavaz et al. |
| 2016/0313798 A1 | 10/2016 | Connor |
| 2016/0313801 A1 | 10/2016 | Wagner et al. |
| 2016/0313899 A1 | 10/2016 | Noel |
| 2016/0350973 A1 | 12/2016 | Shapira et al. |
| 2017/0031502 A1 | 2/2017 | Rosenberg et al. |
| 2017/0061817 A1 | 3/2017 | Mettler May |
| 2017/0080346 A1* | 3/2017 | Abbas .............. A63F 13/825 |
| 2017/0090604 A1 | 3/2017 | Barbier |
| 2017/0119472 A1 | 5/2017 | Herrmann et al. |
| 2017/0123487 A1 | 5/2017 | Hazra et al. |
| 2017/0124474 A1* | 5/2017 | Kashyap .............. G06N 20/00 |
| 2017/0124816 A1 | 5/2017 | Yang et al. |
| 2017/0188980 A1 | 7/2017 | Ash |
| 2017/0259167 A1 | 9/2017 | Cook et al. |
| 2017/0285757 A1* | 10/2017 | Robertson .............. G06F 3/017 |
| 2017/0308118 A1 | 10/2017 | Ito |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0064363 A1 | 3/2018 | Morun et al. |
| 2018/0067553 A1 | 3/2018 | Morun et al. |
| 2018/0088765 A1 | 3/2018 | Bailey |
| 2018/0095630 A1 | 4/2018 | Bailey |
| 2018/0101289 A1 | 4/2018 | Bailey |
| 2018/0120948 A1 | 5/2018 | Aleem et al. |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0307314 A1 | 10/2018 | Connor |
| 2018/0330549 A1* | 11/2018 | Brenton .............. A63F 13/56 |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0025919 A1 | 1/2019 | Tadi et al. |
| 2019/0027141 A1* | 1/2019 | Strong .............. G06F 3/013 |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0150777 A1 | 5/2019 | Guo et al. |
| 2019/0197778 A1* | 6/2019 | Sachdeva .............. G06T 17/05 |

FOREIGN PATENT DOCUMENTS

| | | |
|---|---|---|
| CA | 2 939 644 A1 | 8/2015 |
| CN | 1838933 A1 | 9/2006 |
| CN | 105190578 A | 12/2015 |
| CN | 106102504 A | 11/2016 |
| EP | 2 198 521 B1 | 6/2012 |
| EP | 2 959 394 A1 | 12/2015 |
| EP | 3 104 737 A1 | 12/2016 |
| JP | H05-277080 A | 10/1993 |
| JP | 2005-095561 A | 4/2005 |
| JP | 2010-520561 A | 6/2010 |
| JP | 2016-507851 A | 3/2016 |
| JP | 2017-509386 A | 4/2017 |
| KR | 10-2015-0123254 A | 11/2015 |
| KR | 10-2016-0121552 A | 10/2016 |
| KR | 10-1790147 B1 | 10/2017 |
| WO | 2008/109248 A2 | 9/2008 |
| WO | 2009/042313 A1 | 4/2009 |
| WO | 2014/130871 A1 | 8/2014 |
| WO | 2014/186370 A1 | 11/2014 |
| WO | 2014/194257 A1 | 12/2014 |
| WO | 2014/197443 A1 | 12/2014 |
| WO | 2015/027089 A1 | 2/2015 |
| WO | 2015/073713 A1 | 5/2015 |
| WO | 2015/081113 A1 | 6/2015 |
| WO | 2015/123445 A1 | 8/2015 |
| WO | 2015/199747 A1 | 12/2015 |
| WO | 2016/041088 A1 | 3/2016 |
| WO | 2017/062544 A1 | 4/2017 |
| WO | 2017/092225 A1 | 6/2017 |
| WO | 2017/120669 A1 | 7/2017 |

(56) References Cited

FOREIGN PATENT DOCUMENTS

| | | | |
|---|---|---|---|
| WO | 2017/172185 | A1 | 10/2017 |
| WO | 2019/147958 | A1 | 8/2019 |

OTHER PUBLICATIONS

Non-Final Office Action received for U.S. Appl. No. 16/258,409 dated Apr. 9, 2019, 56 pages.
Notice of Allowance received for U.S. Appl. No. 16/258,409 dated Jul. 19, 2019, 36 pages.
Saponas et al., "Making Muscle-Computer Interfaces More Practical," CHI 2010, Brauns and Brawn, Apr. 10-15, 2010, pp. 851-854.
International Search Report and Written Opinion for International Application No. PCT/US2017/043693 dated Oct. 6, 2017.
International Preliminary Report on Patentability for International Application No. PCT/US2017/043693 dated Feb. 7, 2019.
International Search Report and Written Opinion for International Application No. PCT/US2017/043686 dated Oct. 6, 2017.
International Preliminary Report on Patentability for International Application No. PCT/US2017/043686 dated Feb. 7, 2019.
International Search Report and Written Opinion for International Application No. PCT/US2017/043791 dated Oct. 5, 2017.
International Preliminary Reporton Patentability for International Application No. PCT/US2017/043791 dated Feb. 7, 2019.
International Search Report and Written Opinion for International Application No. PCT/US2017/043792 dated Oct. 5, 2017.
International Preliminary Report on Patentability for International Application No. PCT/US2017/043792 dated Feb. 7, 2019.
International Search Report and Written Opinion for International Application No. PCT/US2018/056768 dated Jan. 15, 2019.
International Search Report and Written Opinion for International Application No. PCT/US2018/061409 dated Mar. 12, 2019.
Benko et al., Enhancing Input On and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24: 11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.
Ding et al., HMM with improved feature extraction-based feature parameters for identity recognition of gesture command operators by using a sensed Kinect-data stream. Neurocomputing. 2017;262: 108-19.
Farina et al., Man/machine interface based on the discharge timings of spinal motor neurons after targeted muscle reinnervation. Nature. Biomedical Engineering. 2017;1: 1-12.
Gallina et al., Surface EMG Biofeedback. Surface Electromyography: Physiology, Engineering, and Applications. 2016:485-500.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9): 1409-18.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Li et al., Motor Function Evaluation of Hemiplegic Upper-Extremities Using Data Fusion from Wearable Inertial and Surface EMG Sensors. Sensors. MDPI. 2017;17(582): 1-17.
Mcintee, A Task Model of Free-Space Movement-Based Geastures. Dissertation. Graduate Faculty of North Carolina State University. Computer Science. 2016. 129 pages.
Naik et al., Source Separation and Identification issues in bio signals: A solution using Blind source seperation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13: 1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Shen et al., I am a Smartwatch and I can Track my User's Arm. University of Illinois at Urbana-Champaign. MobiSys'16. 12 pages.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 16, 2019.
International Search Report and Written Opinion for International Application No. PCT/US2019/015244 dated May 16, 2019.
International Search Report and Written Opinion for International Application No. PCT/US2019/020065 dated May 16, 2019.
Arkenbout et al., Robust Hand Motion Tracking through Data Fusion of 5DT Data Glove and Nimble VR Kinect Camera Measurements. Sensors. 2015;15:31644-71.
Davoodi et al., Development of a Physics-Based Target Shooting Game to Train Amputee Users of Multi joint Upper Limb Protheses. Presence. Massachusetts Institute of Technology. 2012;21(1):85-95.
U.S. Appl. No. 16/258,409, filed Jan. 25, 2019.
Favorskay A et al., Localization and Recognition of Dynamic Hand Gestures Based on Hierarchy of Manifold Classifiers. International Archives of the Photogrammetry, Remote Sensing and Spatial Information Sciences. 2015; XL-5/W6:1-8.
Hauschild et al., A Virtual Reality Environment for Designing and Fitting Neural Prosthetic Limbs. IEEE Transactions on Neural Systems and Rehabilitation Engineering. 2007; 15( 1) :9-15.

(56) References Cited

OTHER PUBLICATIONS

Lee et al., Motion and Force Estimation System of Human Fingers. Journal of Institute of Control, Robotics and Systems. 2011;17(10):1014-1020.
Lopes et al., Hand/arm gesture segmentation by motion using IMU and EMG sensing. ScienceDirect. Elsevier. Procedia Manufacturing. 2017; 11: 107-13.
Martin et al., A Novel Approach of Prosthetic Arm Control using Computer Vision, Biosignals, and Motion Capture. IEEE. 2014. 5 pages.
Mendes et al., Sensor Fusion and Smart Sensor in Sports and Biomedical Applications. Sensors. 2016;16(1569): 1-31.
Sauras-Perez et al., A Voice and Pointing Gesture Interaction System for Supporting Human Spontaneous Decisions in Autonomous Cars. Clemson University. All Dissertations. 2017. 174 pages.
International Preliminary Report on Patentability received for PCT Application Serial No. PCT/US2019/015183 dated Aug. 6, 2020, 7 pages.

\* cited by examiner

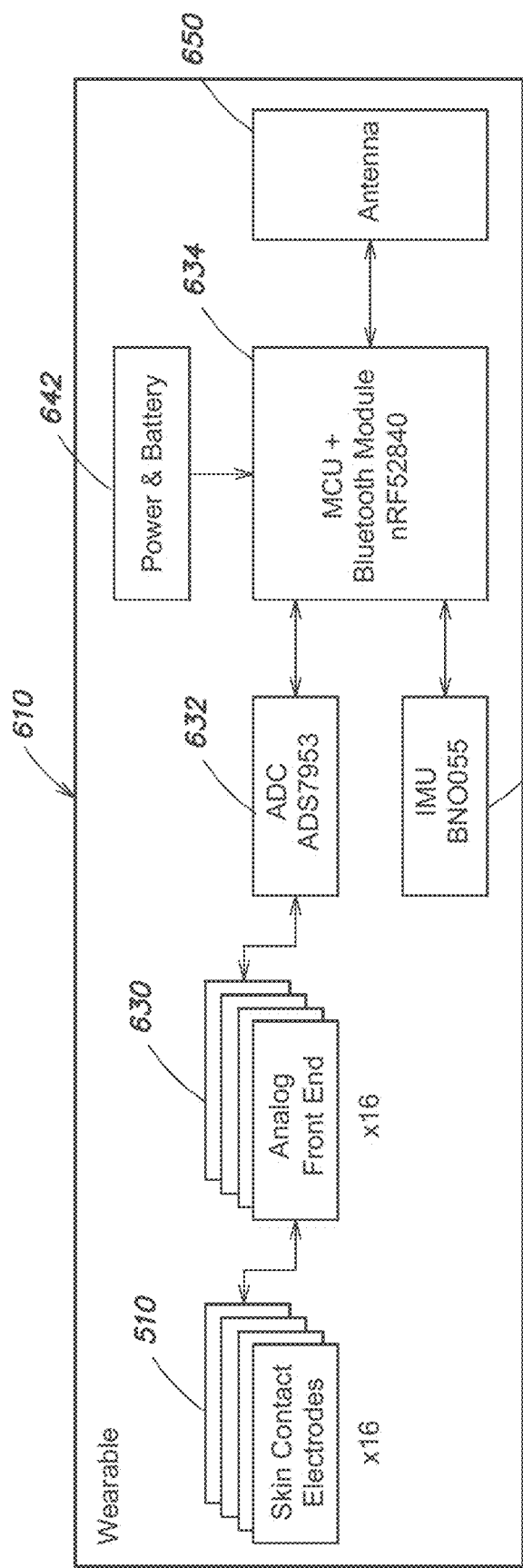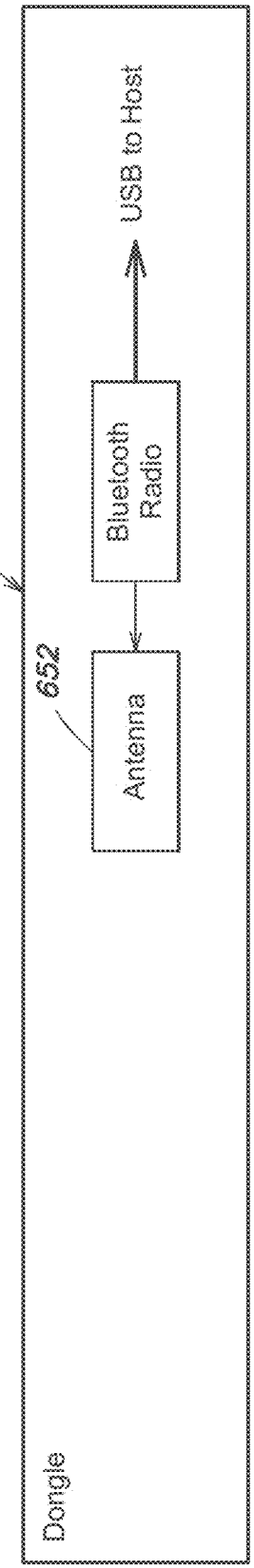

USER-CONTROLLED TUNING OF HANDSTATE REPRESENTATION MODEL PARAMETERS

RELATED APPLICATIONS

This application claims priority under 35 USC § 119(e) of U.S. Provisional Application Ser. No. 62/621,770, filed Jan. 25, 2018, entitled "USER-CONTROLLED TUNING OF HANDSTATE REPRESENTATION MODEL PARAMETERS", which is incorporated by reference in its entirety.

BACKGROUND

In some computer applications that generate musculoskeletal representations of the human body, it is desirable for the application to know the spatial positioning, orientation and movement of a user's body to provide a realistic representation of body movement. For example, in a virtual reality (VR) environment, tracking the spatial position of the user's hand enables the application to represent hand motion in the VR environment, which allows the user to interact with (e.g., by grasping or manipulating) virtual objects within the VR environment. Some existing techniques for tracking movements of a user's body using wearable sensors include using information obtained from multiple Inertial Measurement Units (IMUs) affixed to different parts of the user's body, and using external imaging devices (e.g., fixed-position cameras) to reconstruct the position and orientation of parts of the user's body.

SUMMARY

In some computer applications that generate musculoskeletal representations of the human body, it is appreciated that it is desirable for the application to provide a more realistic representation of body position, movement, and force. In an example in the VR environment, tracking the spatial position of the user's hand enables virtually rendering a hand, and rendering that realistically approximates natural kinematics and gestures may enhance immersion for the user in the virtual environment. Although some camera-based systems attempt to track movement a user's body, it is appreciated that such interpretations may be improved by using wearable neuromuscular sensors for physiological measurements and modeling based on human anatomy.

Some embodiments are directed to predicting information about the positioning and movements of portions of a user's arm and/or hand represented as a multi-segment articulated rigid body system with joints connecting the multiple segments of the rigid body system. Signals recorded by wearable neuromuscular sensors placed at locations on the user's body are provided as input to a statistical model trained to predict estimates of the position (e.g., absolute position, relative position, orientation) and forces associated with a plurality of rigid segments in a computer-based musculoskeletal representation associated with a hand when a user performs one or more movements. The combination of position information and force information associated with segments of a musculoskeletal representation associated with a hand is colloquially referred to herein as a "handstate" of the musculoskeletal representation. As a user performs different movements, a trained statistical model interprets neuromuscular signals recorded by the wearable neuromuscular sensors into position and force estimates (handstate information) that are used to update the musculoskeletal representation. As the neuromuscular signals are continuously recorded, the musculoskeletal representation is updated in real time (or near real-time) and a visual representation of a hand (e.g., within a virtual reality environment) is optionally rendered based on the current handstate estimates.

Other embodiments are directed to a computerized system configured to enable a user to adjust one or more parameters of one or more statistical models used to generate a musculoskeletal representation. The system comprises a user interface configured to instruct a user to perform at least one gesture while wearing a wearable device having a plurality of neuromuscular sensors arranged thereon, and at least one computer processor. The at least one computer processor is programmed to provide as input to the one or more statistical models, a plurality of neuromuscular signals recorded by the neuromuscular sensors during performance of the at least one gesture by the user, render at least one visual representation based on an output of the one or more statistical models, receive user input to adjust one or more parameters of the one or more statistical models based on the rendered at least one visual representation, and adjust one or more parameters of the one or more statistical models based on the received user input.

In one aspect, the one or more statistical models comprises a first statistical model and a second statistical model.

In another aspect, providing as input to the one or more statistical models, comprises providing the plurality of neuromuscular signals as input to the first statistical model and the second statistical model.

In another aspect, rendering at least one visual representation comprises rendering a first visual representation based on an output of the first statistical model, and rendering a second visual representation based on an output of the second statistical model, and receiving user input comprises receiving a selection associated with the first visual representation or the second visual representation.

In another aspect, rendering the first visual representation comprises rendering the first visual representation based on a first musculoskeletal representation generated based on output of the first statistical model, and rendering the second visual representation comprises rendering the second visual representation based on a second musculoskeletal representation generated based on output of the second statistical model.

In another aspect, the at least one computer processor is further programmed to repeatedly switch between displaying the first visual representation and the second visual representation prior to receiving the user input.

In another aspect, the at least one computer processor is further programmed to prompt the user to select a choice from each of a plurality of binary choices associated with different rendered visual representations, and receive user input associated with the plurality of binary choices.

In another aspect, the at least one computer processor is further programmed to aggregate the received user input associated with the plurality of binary choices.

In another aspect, adjusting the one or more parameters of the one or more statistical models comprises adjusting the one or more parameters based on the aggregated user input.

In another aspect, the at least one computer processor is further programmed to overlay the first visual representation with the second visual representation, wherein the first and second visual representations are rendered using different colors.

In another aspect, the at least one computer processor is further programmed to display the first visual representation and the second visual representation at a same time.

In another aspect, the at least one computer processor is further programmed to render the first visual representation and the second visual representation side-by-side.

In another aspect, the user selection associated with the first visual representation or the second visual representation is based on one or more anatomical characteristics of the user.

In another aspect, the at least one gesture comprises a discrete gesture.

In another aspect, receiving the user input comprises receiving the user input during display of the rendered at least one visual representation, wherein the at least one visual representation is rendered based on at least one musculoskeletal representation that is dynamically updated in real-time.

In another aspect, the at least one gesture comprises a continuous gesture, and rendering at least one visual representation comprises generating at least one animation representing the at least one gesture, wherein the at least one animation comprises the at least one visual representation rendered at a plurality of points in time.

In another aspect, receiving the user input comprises receiving the user input during replay of at least a portion of the at least one animation.

In another aspect, the at least one computer processor is further programmed to: receive a selection of one of the plurality of points in time of the animation, and receiving the user input comprises receiving the user input subsequent to receiving the selection of one of the plurality of points in time of the animation.

In another aspect, the at least one computer processor is further programmed to: display at least one user interface control configured to enable the user to adjust one or more parameters of the one or more statistical models, and receiving the user input comprises receiving the user input based on a user interaction with the at least one user interface control.

In another aspect, the at least one user interface control includes a slider or a dial.

In another aspect, the one or more parameters includes a smoothness of the one or more statistical models or a responsiveness of the one or more statistical models.

In another aspect, the at least one computer processor is further programmed to: output from the one or more statistical models, position estimates and/or force estimates associated with the musculoskeletal representation; update the musculoskeletal representation based on the position estimates and/or force estimates; and render the at least one visual representation based on the updated musculoskeletal representation.

In another aspect, the musculoskeletal representation is a musculoskeletal representation associated with a hand, and the position estimates and/or force estimates comprise handstate estimates.

In another aspect, the user interface is a graphical user interface configured to visually instruct the user to perform the at least one gesture.

Other embodiments are directed to a method for enabling a user to adjust one or more parameters of one or more statistical models used to generate a musculoskeletal representation. The method comprises providing as input to the one or more statistical models, a plurality of neuromuscular signals recorded by a plurality of neuromuscular sensors during performance of at least one gesture by a user, wherein the at least one gesture is performed by the user while wearing a wearable device having the plurality of neuromuscular sensors arranged thereon, rendering at least one visual representation based on an output of the one or more statistical models, receiving user input to adjust one or more parameters of the one or more statistical models based on the rendered at least one visual representation, and adjusting one or more parameters of the one or more statistical models based on the received user input.

Other embodiments are directed to a computer-readable medium encoded with a plurality of instructions that, when executed by at least one computer processor, performs a method. The method comprises providing as input to the one or more statistical models, a plurality of neuromuscular signals recorded by a plurality of neuromuscular sensors during performance of at least one gesture by a user, wherein the at least one gesture is performed by the user while wearing a wearable device having the plurality of neuromuscular sensors arranged thereon, rendering at least one visual representation based on an output of the one or more statistical models, receiving user input to adjust one or more parameters of the one or more statistical models based on the rendered at least one visual representation, and adjusting the one or more parameters of the one or more statistical models based on the received user input.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIGS. 6A and 6B schematically illustrate components of a computer-based system on which some embodiments are implemented. FIG. 6A illustrates a wearable portion of the computer-based system and FIG. 6B illustrates a dongle portion connected to a computer, wherein the dongle portion is configured to communicate with the wearable portion.

DETAILED DESCRIPTION

Figure 1:
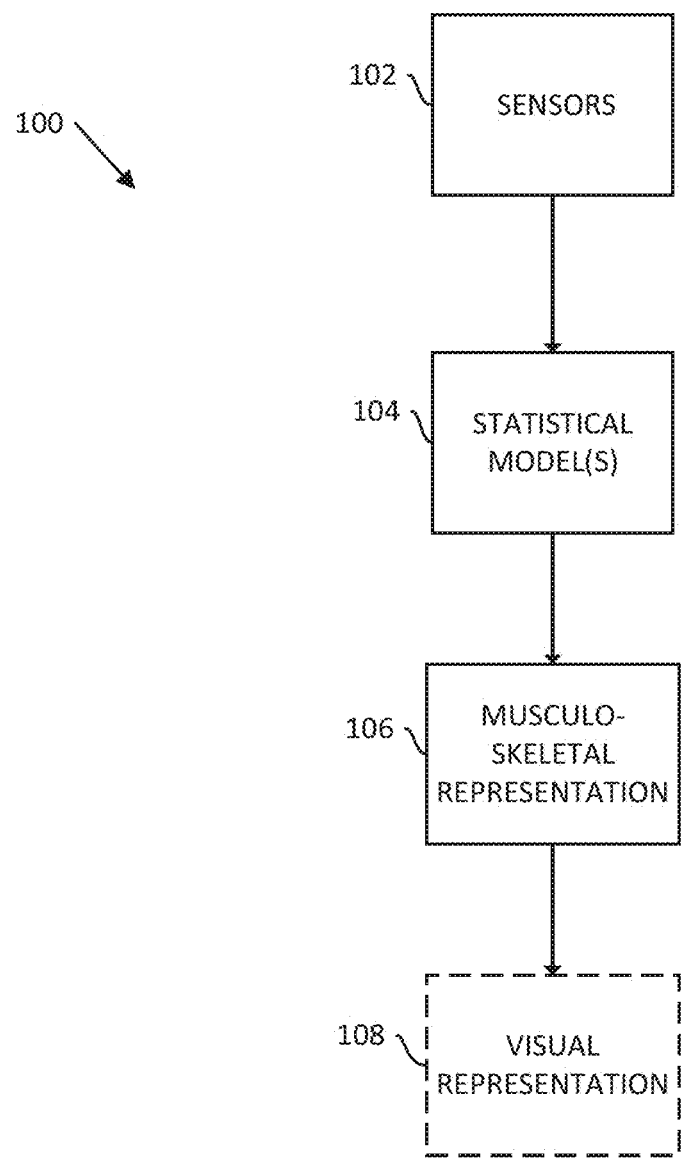
FIG. 1 is a schematic diagram of a computer-based system for reconstructing handstate information in accordance with some embodiments of the technology described herein.

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained statistical model, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

FIG. 1 illustrates a system 100 in accordance with some embodiments. The system includes a plurality of sensors 102 configured to record signals resulting from the movement of portions of a human body. Sensors 102 may include autonomous sensors. As used herein, the term "autonomous sensors" refers to sensors configured to measure the movement of body segments without requiring the use of external devices. In some embodiments, sensors 102 may also include non-autonomous sensors in combination with autonomous sensors. As used herein, the term "non-autonomous sensors" refers to sensors configured to measure the movement of body segments using external devices. Examples of external sensors used in non-autonomous sensors include, but are not limited to, wearable (e.g. body-mounted) cameras, global positioning systems, or laser scanning systems.

Autonomous sensors may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that autonomous sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the autonomous sensors includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 102 only includes a plurality of neuromuscular sensors (e.g., EMG sensors). In other embodiments, sensors 102 includes a plurality of neuromuscular sensors and at least one "auxiliary" sensor configured to continuously record a plurality of auxiliary signals. Examples of auxiliary sensors include, but are not limited to, other autonomous sensors such as IMU sensors, and non-autonomous sensors such as an imaging device (e.g., a camera), a radiation-based sensor for use with a radiation-generation device (e.g., a laser-scanning device), or other types of sensors such as a heart-rate monitor.

System 100 also includes one or more computer processors (not shown in FIG. 1) programmed to communicate with sensors 102. For example, signals recorded by one or more of the sensors may be provided to the processor(s), which may be programmed to execute one or more machine learning algorithms that process signals output by the sensors 102 to train one or more statistical models 104, and the trained (or retrained) statistical model(s) 104 may be stored for later use in generating a musculoskeletal representation 106, as described in more detail below. Non-limiting examples of statistical models that may be used in accordance with some embodiments to predict handstate information based on recorded signals from sensors 102 are discussed in detail below.

System 100 also optionally includes a display controller configured to display a visual representation 108 (e.g., of a hand). As discussed in more detail below, one or more computer processors may implement one or more trained statistical models configured to predict handstate information based, at least in part, on signals recorded by sensors 102. The predicted handstate information is used to update the musculoskeletal representation 106, which is then optionally used to render a visual representation 108 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained statistical model to accurately represent an intended handstate. In another example, a metric associated with a musculoskeletal representation (e.g., a likelihood metric for one or more hand gestures or a quality metric that represents a confidence level of estimating a position, movement, or force of a segment of a multi-segment articulated rigid body system such as a hand) may be provided to a user or other third-party.

In some embodiments, a computer application configured to simulate a virtual reality environment may be instructed to display a visual representation of the user's hand. Positioning, movement, and/or forces applied by portions of the hand within the virtual reality environment may be displayed based on the output of the trained statistical model(s). The visual representation may be dynamically updated based on current reconstructed handstate information as continuous signals are recorded by the sensors 102 and processed by the trained statistical model(s) 104 to provide an updated computer-generated representation of the user's positioning, movement, and/or force that is updated in real-time.

As discussed above, some embodiments are directed to using a statistical model for predicting musculoskeletal information based on signals recorded from wearable autonomous sensors. The statistical model may be used to predict the musculoskeletal position information without having to place sensors on each segment of the rigid body that is to be represented in the computer-generated musculoskeletal representation. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model though training based on recorded sensor data. Constraints imposed in the construction of the statistical model are those set by anatomy and the physics of a user's body, while constraints derived from statistical patterns are those set by human behavior for one or more users from which sensor measurements are measured. As described in detail below, the constraints may comprise part of the statistical model itself being represented by information (e.g., connection weights between nodes) in the model.

As discussed above, some embodiments are directed to using a statistical model for predicting handstate information to enable the generation and/or real-time update of a computer-based musculoskeletal representation. The statistical model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

Figure 2:
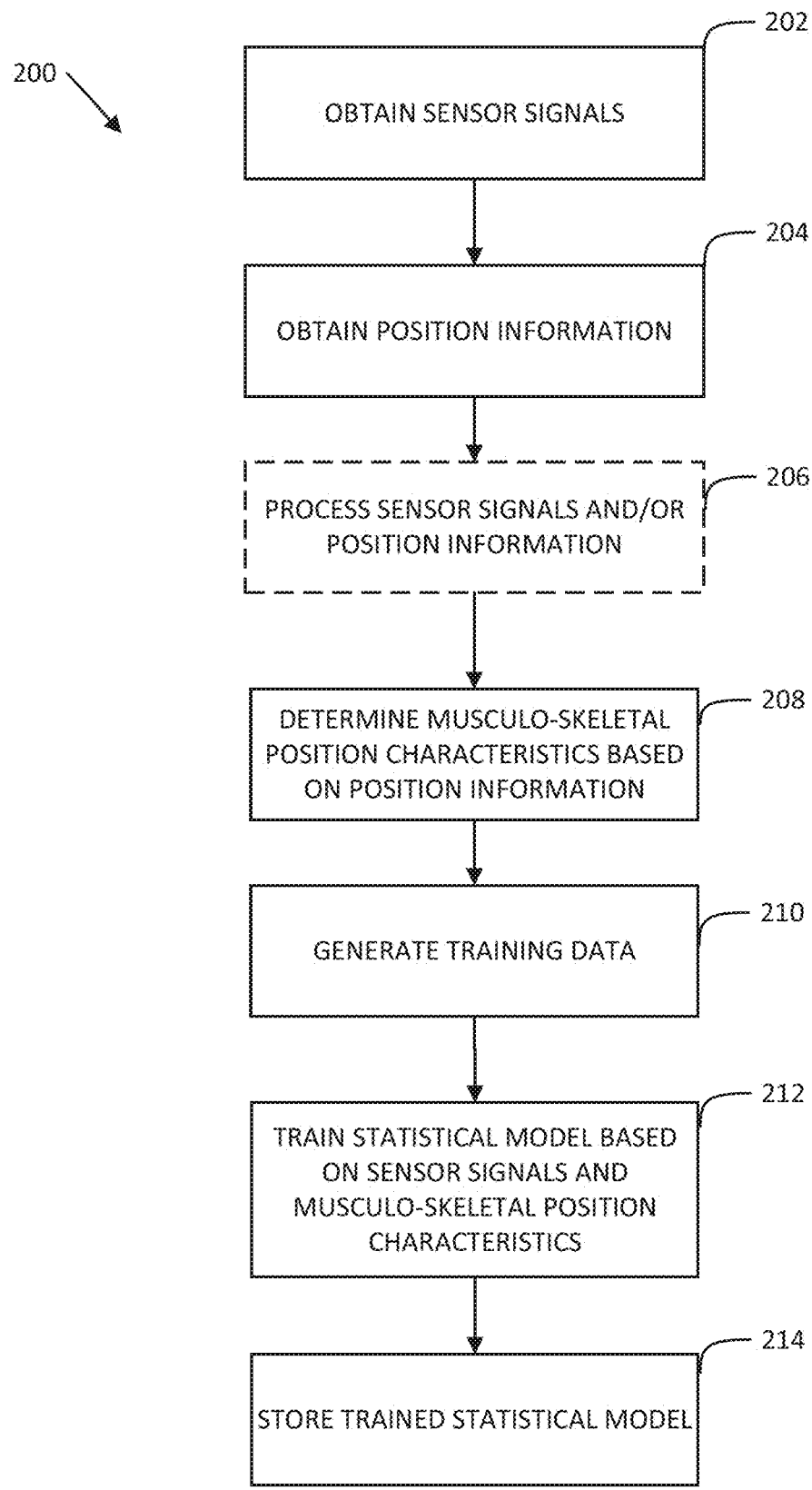
FIG. 2 is a flowchart of a process for generating a statistical model for predicting musculoskeletal position information using signals recorded from sensors, in accordance with some embodiments of the technology described herein.

FIG. 2 describes a process 200 for generating (sometimes termed "training" herein) a statistical model using signals recorded from sensors 102. Process 200 may be executed by any suitable computing device(s), as aspects of the technology described herein are not limited in this respect. For example, process 200 may be executed by one or more computer processors described with reference to FIGS. 1, 6A and 6B. As another example, one or more acts of process 200 may be executed using one or more servers (e.g., servers included as a part of a cloud computing environment). For example, at least a portion of act 210 relating to training of a statistical model (e.g., a neural network) may be performed using a cloud computing environment.

Process 200 begins at act 202, where a plurality of sensor signals are obtained for one or multiple users performing one or more movements (e.g., typing on a keyboard). In some embodiments, the plurality of sensor signals may be recorded as part of process 200. In other embodiments, the plurality of sensor signals may have been recorded prior to the performance of process 200 and are accessed (rather than recorded) at act 202.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 202 correspond to signals from one type of sensor (e.g., one or more IMU sensors or one or more neuromuscular sensors) and a statistical model may be trained based on the sensor signals recorded using the particular type of sensor, resulting in a sensor-type specific trained statistical model. For example, the obtained sensor signals may comprise a plurality of EMG sensor signals arranged around the lower arm or wrist of a user and the statistical model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors. MMG sensors. SMG sensors), a separate statistical model may be trained for each of the types of sensors and the outputs of the sensor-type specific models may be combined to generate a musculoskeletal representation of the user's body. In other embodiments, the sensor signals obtained in act 202 from two or more different types of sensors may be provided to a single statistical model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 202 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{x_k | 1 \leq k \leq K\}$ at time points $t_1, t_2, \ldots, t_K$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate a statistical model that can accurately predict musculoskeletal position information associated with performance of the task.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting musculoskeletal position information associated with multiple different actions that may be taken by the user. For example, training data that incorporates musculoskeletal position information for multiple actions may facilitate generating a statistical model for predicting which of multiple possible movements a user may be performing.

As discussed above, the sensor data obtained at act 202 may be obtained by recording sensor signals as each of one or multiple users performs each of one or more tasks one or more multiple times. As the user(s) perform the task(s), position information describing the spatial position of different body segments during performance of the task(s) may be obtained in act 204. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 202 may be recorded simultaneously with recording of the position information obtained in act 804. In this example, position information indicating the position of each finger segment over time as the grasping motion is performed is obtained.

Next, process 200 proceeds to act 206, where the sensor signals obtained in act 202 and/or the position information obtained in act 204 are optionally processed. For example, the sensor signals or the position information signals may be processed using amplification, filtering, rectification, or other types of signal processing.

Next, process 200 proceeds to act 208, where musculoskeletal position characteristics are determined based on the position information (as collected in act 204 or as processed in act 206). In some embodiments, rather than using recorded spatial (e.g., x, y, z) coordinates corresponding to the position sensors as training data to train the statistical model, a set of derived musculoskeletal position characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 204 may be represented by a vector of n joint angles at each of a plurality of time points, where n is the number of joints or connections between segments in the articulated rigid body model.

Next, process 200 proceeds to act 210, where the time series information obtained at acts 202 and 208 is combined to create training data used for training a statistical model at act 210. The obtained data may be combined in any suitable way. In some embodiments, each of the sensor signals obtained at act 202 may be associated with a task or movement within a task corresponding to the musculoskeletal position characteristics (e.g., joint angles) determined based on the positional information recorded in act 204 as the user performed the task or movement. In this way, the sensor signals may be associated with musculoskeletal position characteristics (e.g., joint angles) and the statistical model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 200 proceeds to act 212, where a statistical model for predicting musculoskeletal position information is trained using the training data generated at act 210. The statistical model being trained may take as input a sequence of data sets each of the data sets in the sequence comprising an n-dimensional vector of sensor data. The statistical model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the statistical model may take as input a sequence of vectors $\{x_k | 1 \leq k \leq K\}$ generated using measurements obtained at time points $t_1, t_2, \ldots, t_K$, where the ith component of vector $x_j$ is a value measured by the ith sensor at time $t_j$ and/or derived from the value measured by the ith sensor at time $t_j$. In another non-limiting example, a derived value provided as input to the statistical model may comprise features extracted from the data from all or a subset of the sensors at and/or prior to time $t_j$ (e.g., a covariance matrix, a power spectrum, a combination thereof, or any other suitable derived representation). Based on such input, the statistical model may provide output indicating, a probability that a musculoskeletal representation of the user's body will be characterized by a set of musculoskeletal position characteristics. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 212 using the sensor data obtained at act 202.

As another example, in some embodiments, the statistical model may take as input, features derived from the sensor data obtained at act 202. In such embodiments, the statistical model may be trained at act 212 using features extracted from the sensor data obtained at act 202. The statistical model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the statistical model may be derived from the sensor data obtained at act 202 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 212, values for parameters of the statistical model may be estimated from the training data generated at act 210. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In embodiments where the statistical model is a recurrent neural network (e.g., an LSTM), the statistical model may be trained using stochastic gradient descent and backpropagation through time. The training may employ a cross-entropy loss function and/or any other suitable loss function, as aspects of the technology described herein are not limited in this respect.

Next, process 200 proceeds to act 214, where the trained statistical model is stored (e.g., in datastore—not shown). The trained statistical model may be stored using any suitable format, as aspects of the technology described herein are not limited in this respect. In this way, the statistical model generated during execution of process 200 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to a statistical model trained using one or more techniques described above in connection with FIG. 2. In some embodiments that continuously record autonomous signals, the continuously recorded signals (raw or processed) may be continuously or periodically provided as input to the trained statistical model for prediction of musculoskeletal position information (e.g., joint angles) for the given set of input sensor data. As discussed above, in some embodiments, the trained statistical model is a user-independent model trained based on autonomous sensor and position information measurements from a plurality of users. In other embodiments, the trained model is a user-dependent model trained on data recorded from the individual user from which the data associated with the sensor signals is also acquired.

After the trained statistical model receives the sensor data as a set of input parameters, the predicted musculoskeletal position information is output from the trained statistical model. As discussed above, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained statistical model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the statistical model to provide new predictions of the musculoskeletal position information (e.g., an updated set of joint angles), the computer-based musculoskeletal representation of the user's body may be updated based on the updated set of joint angles determined based on the output of the statistical model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculoskeletal representation in real time.

Figure 3:
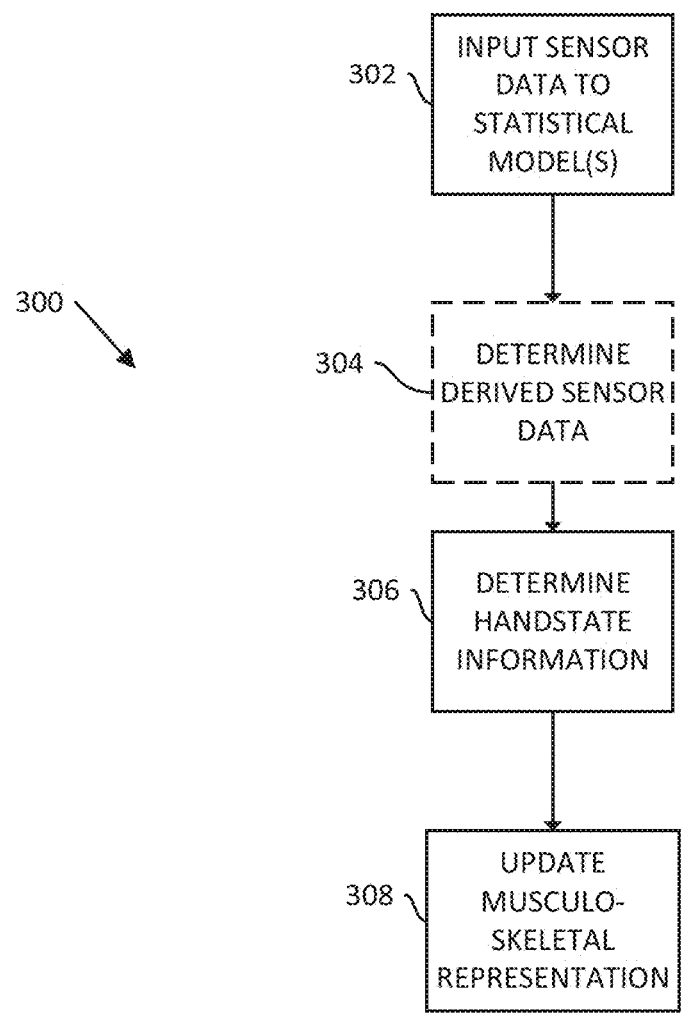
FIG. 3 is a flowchart of a process for determining handstate information in accordance with some embodiments of the technology described herein.
Figure 5A:
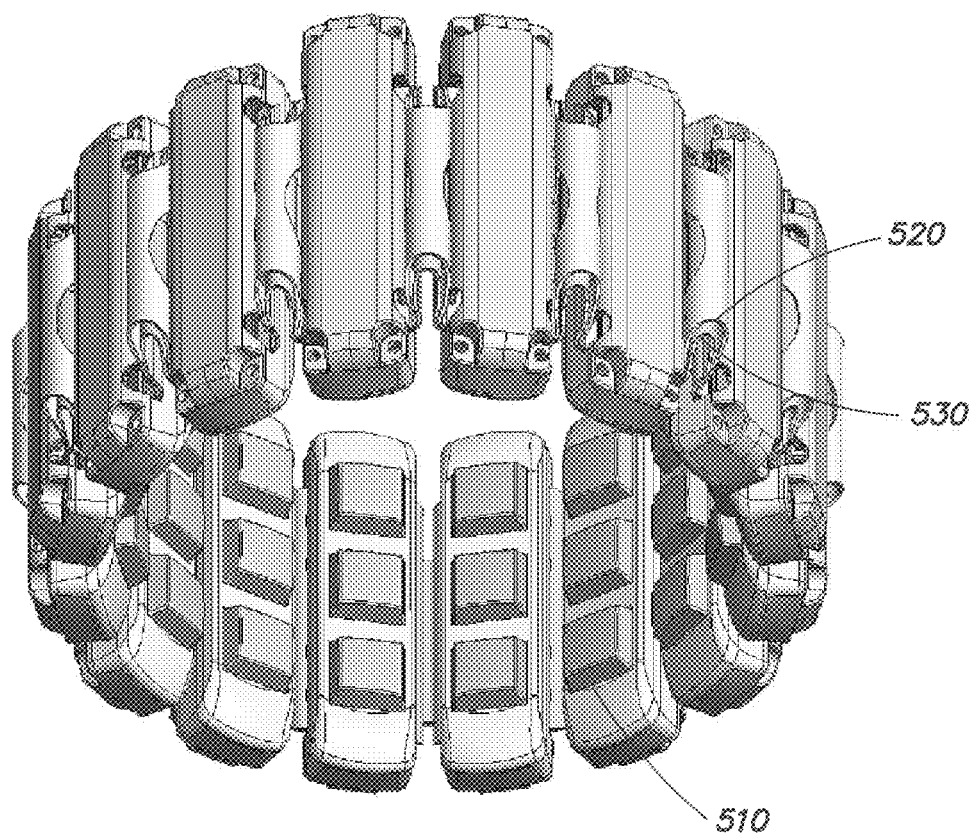
FIG. 5A illustrates a wearable system with sixteen EMG sensors arranged circumferentially around an elastic band configured to be worn around a user's lower arm or wrist, in accordance with some embodiments of the technology described herein.
Figure 5B:
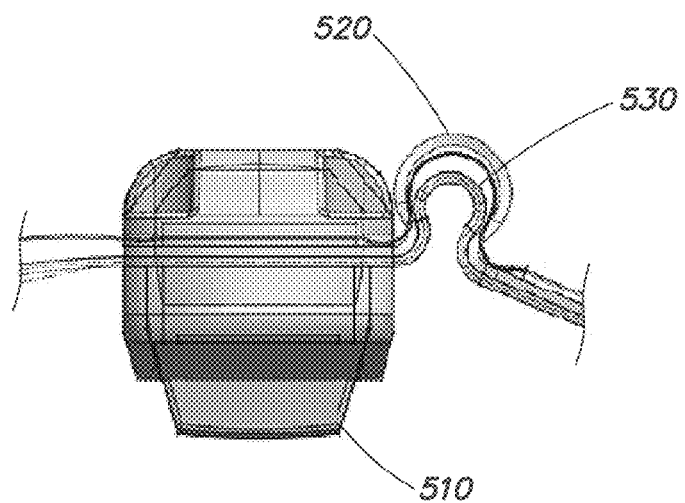
FIG. 5B is a cross-sectional view through one of the sixteen EMG sensors illustrated in FIG. 5A.

FIG. 3 illustrates a process 300 for determining handstate information based on recorded sensor data in accordance with some embodiments. In act 202, sensor data recorded by one or more sensors is provided as input to one or more trained statistical models used to generate estimates of handstate information, as described briefly above. In some embodiments, the sensors include a plurality of neuromuscular sensors (e.g., EMG sensors) arranged on a wearable device worn by a user. For example, EMG sensors may be arranged on an elastic band configured to be worn around a wrist or forearm of the user to record neuromuscular signals from the user as the user performs various movements or gestures. An example wearable device that may be used in accordance with some embodiments is shown in FIGS. 5A and 5B, which are described in more detail below.

As used herein, the term "gestures" refers to a static or dynamic configuration of one or more body parts including the position of the one or more body parts and forces associated with the configuration. For example, gestures include discrete gestures, such as pressing the palm of a hand down on a solid surface or grasping a ball, continuous gestures, such as a waving a finger back and forth or throwing a ball, or a combination of discrete and continuous gestures such as grasping and throwing a ball. Gestures may be defined by an application configured to prompt a user to perform the gestures or, alternatively, gestures may be arbitrarily defined by a user. In some cases, hand and arm gestures may be symbolic and used to communicate according to cultural standards.

In addition to a plurality of neuromuscular sensors, some embodiments include one or more auxiliary sensors configured to continuously record auxiliary signals that may also be provided as input to the one or more trained statistical models. Examples of auxiliary sensors include IMU sensors, imaging devices, radiation detection devices (e.g., laser scanning devices), heart rate monitors, or any other type of biosensors configured to continuously record biophysical information from the user during performance of one or more movements or gestures.

Process 300 then proceeds to act 304, where derived signal data is optionally determined based on the signals recorded by the sensors. For example, accelerometer data recorded by one or more IMU sensors may be integrated and/or filtered to determine derived signal data associated with one or more muscles during performance of a gesture. The derived signal data may be provided as input to the trained statistical model(s) in addition to or as an alternative to raw signal data or otherwise processed raw signal data recorded by the sensors.

Process 300 then proceeds to act 306, where handstate information is determined based on the output of the trained statistical model(s). The gestures performed by the user include discrete gestures, such as placing the hand palm down on a table, and continuous gestures, such as waving a finger back and forth. The neuromuscular signals are recorded continuously during user movements including during performance of the gesture and are provided continuously as input to the trained statistical model, resulting in real-time estimation of the positions and/or forces of the user's hand (i.e., handstate information) as output of the trained statistical model(s). Process 300 then proceeds to act 308, where the real-time handstate estimates output from the trained statistical model(s) are used to update a musculoskeletal representation associated with a hand. In some embodiments, the musculoskeletal representation represents rigid segments within a hand and the joints connecting the rigid segments. In other embodiments, the musculoskeletal representation includes at least some rigid segments corresponding to an arm connected to the hand. Accordingly, the phrase "musculoskeletal representation associated with hand" should be understood to include both musculoskeletal representations of the hand and musculoskeletal representations that include a representation of the hand and at least a portion of an arm connected to the hand.

The inventors have recognized that individual users of systems such as those described in connection with FIG. 1 may have different needs or preferences regarding how the statistical model should be tuned or optimized to produce estimates that represent a movement, position, and/or force of a part of the body (e.g., the hand) or a desired response (e.g., a gesture-based response) based on a movement, position, and/or force of a part of the body (e.g., the hand). The inventors have further recognized that it may be advantageous to account for user-specific physiological and anatomical differences in order to optimize the model performance for individual users. The inventors have appreciated that enabling a user to select a particular statistical model from a number of available models and/or to have control over the tuning or adjustment of various parameters of the models may enable usage of statistical model(s) 104 that more accurately represent the user's preferences and/or physiological and anatomical characteristics. Embodiments where a user may select a statistical model and/or tune a parameter of the statistical model for tracking their own body part may be referred to as "self-tuning" or "self-actuated tuning". For example, some users may differ with regard to the presence or absence of the palmaris longus muscle, which changes the recorded sensor data (e.g., neuromuscular signals) when performing gestures. By selecting a statistical model that is trained to predict handstate information while accounting for differing anatomical characteristics, a visual representation rendered based on the output of the selected statistical model may more accurately reflect the performance of the gesture(s) as performed by individual users.

The inventors have further recognized that conventional machine learning models, after training and tuning, generally run in an open-loop and automated fashion. In some cases, a developer of a machine learning model may tune the parameters of the model or alter the architecture of the model to optimize its behavior. However, these efforts require specific and technical expertise that is not broadly available and thus limits the ability of the machine learning model to be deployed inexpensively and at scale. Embodiments described herein enable a non-technical user to select an appropriate statistical model and/or tune parameters of a model, thereby enhancing the scalability and accuracy with which the model can estimate handstate information for the user. In addition, techniques described herein leverage third party feedback, such as feedback from trained experts, in model refinement as such experts may provide additional contributions by understanding how to change models/parameters to improve performance.

More accurate estimation of handstate allows for enhanced immersion for applications wherein handstate is virtually rendered. Another benefit of improving models for estimating handstate is improved reliability and sensitivity (e.g. reducing false positive and false negative for gesture identification) activate specific gestures in various gesture control schemes. For example, improved models can reliably identify a specific gesture mapped to one or more control signals to control various aspects of a VR environment.

In some embodiments, a third-party other than the user may be enabled to select a particular statistical model from a number of available models and/or to have control over the tuning or adjustment of various parameters of the models in order to more accurately represent the user's preferences and/or physiological and anatomical characteristics. The third-party user may be referred to as a "model selection and tuning expert" or a "handstate technician" and may be physically present with the user whose body part (e.g. hand) is being tracked via a system such as that described in connection with FIG. 1. Alternatively or additionally, the handstate technician may be remote from the individual whose body part is being tracked. In such embodiments, the remote handstate technician is able to remotely and in real-time (or approximately in real-time) view outputs of a statistical model for estimating a movement, position, and/or force of the hand (or other body part) of the user, and to select among a plurality of statistical models or tune one or more model parameters remotely. In order to select among statistical models and/or tune a model parameter, the remote handstate technician may access data about the user via a computerized user interface (e.g., via a computer, tablet, or smartphone) to view real-time data collected from the user which may include: raw or processed neuromuscular activity data (e.g., data recorded via EMG sensors), confidence levels or other metrics reflecting an estimate of handstate or detection of a gesture used in a machine control scheme, a virtual rendering of the user's body part (e.g. hand), and/or a video or image of the user from a camera. Systems and methods that enable remote access for model selection and/or parameter tuning are advantageous, because they enable a third-party with specialized skills or training to support a user in optimizing or otherwise configuring a system for tracking a movement, position, and/or force of a body part (e.g. hand). For example, a prosthetist may provide a tuning or optimization service for amputees using a myocontrol interface or prosthetic arm controlled through tracking a body part. Myocontrol prosthetics are controlled by a user (e.g. an amputee) by contracting one or more muscles. The identity of the muscles used in a myocontrol prosthetic may be personalized based on the specific retained anatomy and function of the user. A myocontrol interface may be used to program or optimize the control of a prosthetic by a user based on a pattern of neuromuscular activity.

Figure 4:
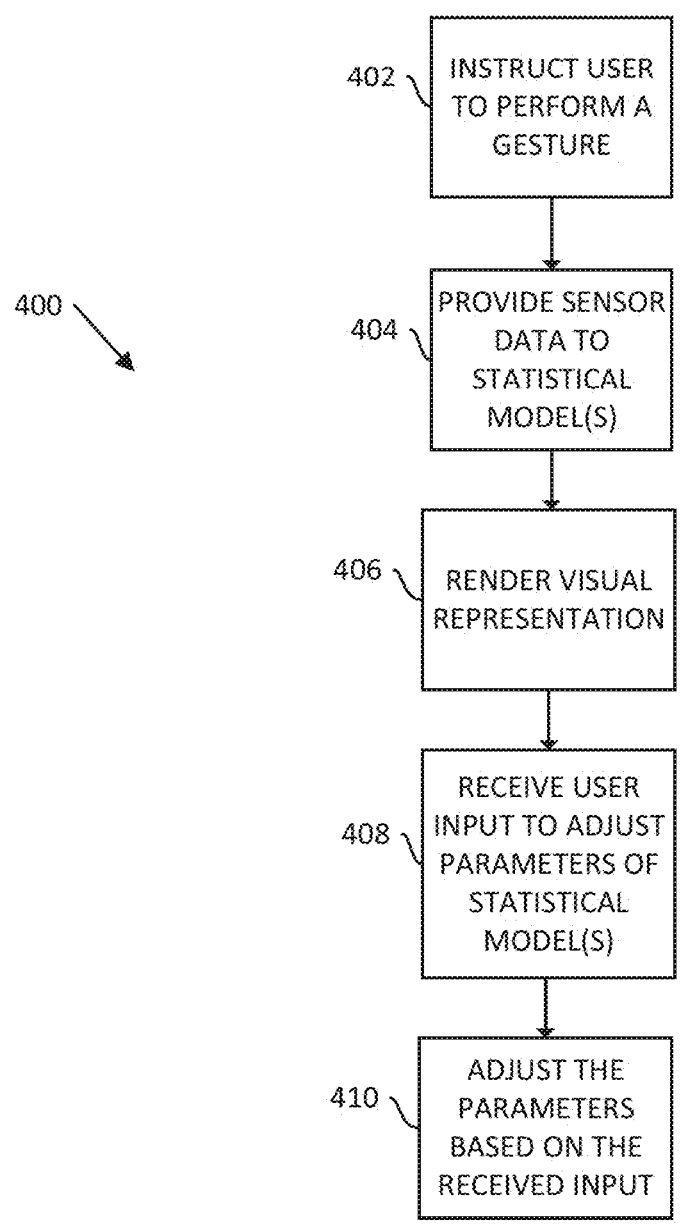
FIG. 4 is a flowchart of a process for enabling a user to adjust one or more parameters of statistical model(s) in accordance with some embodiments of the technology described herein.

FIG. 4 illustrates a process 400 for enabling a user or third-party (e.g., handstate technician) to adjust one or more parameters of one or more statistical model(s) 104, in accordance with some embodiments. In act 402 of process 400, the one or more computer processors of system 100 may be programmed to cause a user interface (e.g., a graphical user interface) to present one or more instructions to a user to perform one or more gestures, for example, while the user is wearing the one more wearable devices described herein. In some embodiments, the user may be instructed to perform particular gestures, whereas in other embodiments the user may be instructed to perform any movements that they choose as a "user-defined" gesture. The gestures performed by the user may include discrete gestures, such as placing a hand palm down on a table, and continuous gestures, such as waving a finger back and forth. In some embodiments, a non-autonomous sensor such as a camera may be used to detect a particular gesture during performance of "user-defined" gestures. The wearable devices may have a plurality of neuromuscular sensors arranged thereon that record neuromuscular signals from the user as the user performs the gestures, as described above.

Process 400 then proceeds to act 404, where the recorded neuromuscular signals are provided as input to one or more statistical models 104 that are used to generate estimates of the handstate information. As described above, the neuromuscular signals are recorded during performance of the gestures and are provided continuously as input to the statistical models, resulting in real-time estimation of the positions and/or forces of the user's hand (e.g., handstate information) as output of the trained statistical model(s). These real-time handstate estimates output from the trained statistical model(s) are used to update a musculoskeletal representation associated with a hand.

Process 400 then proceeds to act 406, where at least one visual representation of the hand is rendered based on the output of the statistical models 104. In some embodiments, the visual representation of the hand is rendered based on the updated musculoskeletal representation associated with the hand. Real-time updating of the musculoskeletal representation as the user is performing a gesture and subsequent rendering of the visual representation reflecting the updated musculoskeletal model provides visual feedback to the user about the effectiveness of the trained statistical model to accurately represent the intended gesture. For a user or third-party, viewing the actual movements of a body part (e.g. hand, wrist, and/or arm) leverages innate human abilities to recognize natural movements and to compare the output of one or more statistical models to actual movements of a body part (e.g., a handstate).

In some embodiments, the recorded neuromuscular signals are provided as input to at least two different statistical models at act 404. Each of the two different statistical models may be configured to output handstate estimates based on the input neuromuscular signals. The handstate estimates output by the different statistical models may be used to update different musculoskeletal representations of a hand, and in act 306, different visual representations may be rendered based on the outputs of the updated musculoskeletal representations. In other words, a first visual representation may be rendered based on an output of a first statistical model and a second visual representation may be rendered based on an output of a second statistical model. It will be appreciated that while two statistical models and corresponding visual representations are described herein, any number of models and corresponding visual representations may alternatively be used without departing from the scope of this disclosure.

Process 400 then proceeds to act 408, where user input (e.g., input from the user or third-party) is received to adjust one or more parameters of the statistical models 104. In some embodiments, receiving the user input includes receiving a selection associated with the first visual representation corresponding to the first statistical model or the second visual representation corresponding to the second statistical model. In some implementations, the first and second statistical models have different parameters associated therewith.

In some embodiments, receiving the user input comprises receiving input to adjust/tune parameters associated with a particular class of statistical models. The parameters of the statistical models that may be adjusted include, but are not limited to, a smoothness of the models, a responsiveness of the models, and/or other tunable parameters. The user input may include a user selection of the parameters that are to be adjusted and respective values of the parameters indicative of the adjustment. In some implementations, the computer processors may be programmed to display at least one user interface control (e.g., on the user interface) that enables the user or third-party to adjust the parameter(s) of the statistical models and/or select values for the parameters. In these implementations, the user input may be received based on a user interaction with the user interface control. Examples of the user interface control include a dial, a slider, a drop-down menu, and/or any other user interface control element. In some embodiments, the user input may be received during display of the rendered one or more visual representations, as discussed in more detail below.

In some implementations, the user interface may present one or more confidence levels or other metrics concerning the output of a particular class of statistical model. In some embodiments, the confidence levels or other metrics may be displayed with visual representation(s) generated based on the output of statistical model(s). In some embodiments, the selection of a particular model from a number of available models and/or parameter adjustment of the models may be performed based on these metrics. For example, the metrics may be provided for each of the different available models and the user or third-party may select a particular model with a metric indicative of a higher confidence level than another model with a metric indicative of a lower confidence level.

Process 400 then proceeds to act 410, where the one or more parameters of the statistical models 104 are adjusted based on the received user input. In some embodiments, adjusting the parameters of the statistical models includes adjusting the parameter(s) of the statistical models based on the received values of the parameters. In other embodiments, adjusting the parameter(s) of the statistical models include selecting the first statistical model used to generate a first visual representation or the second statistical model used to generate a second visual representation based on the received user input.

In some implementations, after selection of the first or the second statistical model at act 410, the process returns to act 408, where further user input may be received to adjust parameters of the selected model. In some embodiments, a confidence level or other metric reflecting the adjusted parameters may be provided to the user or third-party. Model selection, parameter adjustment or any combination of model selection and parameter adjustment may occur at each iteration of acts 408 and 410. Acts 408 and 410 may be repeated until the user or third-party is satisfied that the selected and tuned statistical model is accurate (e.g., via an indication through a user interface that a particular gesture has been identified or a visual representation rendered based on the output of the selected statistical model).

According to some embodiments, the one or more computer processors may be programmed to display the rendered first visual representation and the rendered second visual representation at the same time. The first and second visual representations may be displayed at the same time in any suitable way. For example, the first and second visual representations may be displayed side-by-side. Alternatively, the first and second visual representations may be overlaid on each other, with the visual representations being rendered using different colors, thereby enabling the user or third-party to readily distinguish and select between the two representations.

In some embodiments, the one or more computer processors may be programmed to display the first and second visual representations at different times. For example, the one or more computer processors may be programmed to repeatedly switch between displaying the first visual representation and the second visual representation until user or third-party input is received and/or in response to a user or third-party command to switch between the two visual representations.

In some implementations, the one or more computer processors may be programmed to prompt the user or third-party to select a choice from each of a plurality of binary choices associated with different rendered visual representations and to receive user input associated with the plurality of binary choices. The user input when presented with a binary choice may indicate the user's preference for using a first statistical model with first parameters compared to a second statistical model with second parameters. In these implementations, the one or more computer processors may be programmed to aggregate the received user input associated with the binary choices and the one or more parameters of the statistical model may adjusted based on the aggregated user input.

In some embodiments, the user input reflecting a selection of a model or model parameter may be stored to a non-transitory computer-readable storage medium (e.g., a computer memory, a portable memory, a compact disk, etc.). In related embodiments, previous selections of a model or model parameter by the user or third-party may be accessed from a non-transitory computer-readable storage medium and provided to the user third-party via a user interface. Alternatively or additionally, aggregated historical data from other users may be provided to the user or third-party. For example, statistical models and model parameters selected by other individuals sharing some characteristic with the user (e.g. demographic, anatomical, physiological, etc.) may be provided via a user interface.

In some embodiments, a user selection associated with the first visual representation of the hand or the second visual representation of the hand may be based on one or more anatomical characteristics of the user. In some implementations, the one or more computer processors may include or communicate with one or more detector circuits that are programmed to analyze or process the signals recorded by sensors 102 to identify or detect these anatomical characteristics based on the signals. For example, a detector circuit may be configured to detect whether a user has the palmaris longus muscle in their arm. In some implementations, to determine whether a user has the palmaris longus muscle, the user may be instructed to pinch the fingertips of their pinky and thumb while flexing their wrist. In response to a determination that the user does have the palmaris longus muscle in their arm, the computer processor(s) may be programmed to identify at least two models (e.g., a first and second statistical model) to be used to generate the handstate estimates used to update a musculoskeletal representation. The computer processor(s) may be further programmed to prompt the user or third-party to select either a first visual representation of the hand or a second visual representation of the hand, wherein the first and second visual representations of the hand are rendered based on output from the first and second statistical models, respectively.

According to some embodiments, user input is received during display of the rendered one or more visual representations of the hand. In some implementations, the visual representations are continuously updated based on real-time estimates of the positions and/or forces of the user's hand (e.g., handstate information). For example, both the first and second visual representations of the hand may be continuously updated based on respective outputs of the first and second trained statistical models. The user input (e.g., user or third-party selection of one of the models and/or user adjustment to parameters of one or both models) may be received during the display of the continuously updated visual representations.

In some embodiments, the user input may be received during replay of an animation of the rendered one or more visual representations of the hand. When a user performs a gesture, the first and second visual representations (corresponding to the first and second statistical models) of the hand performing the gesture may be rendered. The first and second visual representations may be replayed repeatedly, for example, in response to a user or third-party selection of a replay button displayed on a user interface. In other words, the user or third-party may replay an animation of the representations when adjusting the model parameters or selecting one of the models.

In some embodiments, the one or more computer processors may be programmed to receive a user or third-party selection of one of a plurality of points in time of an animation corresponding to a visual representation. For example, the selected point in time may represent part of the animation in which the model estimates poorly represent the intended movement or gesture. User or third-party input may then be received subsequent to receiving the selection of the point in time of the animation during which the model estimates poorly represent the intended movement or gesture. For example, when the user performs a gesture, the first and second visual representations (corresponding to the first and second statistical models) of the hand performing the gesture may be rendered. The user or third-party may pause the replay of the first and/or second representation (e.g., in response to a user selection of a pause button) to inspect one or more points in time in which the model estimates poorly estimate the intended gesture. The user or third-party may adjust the model parameters to correct the representation at the selected point in time, and then replay the complete representation (i.e., the whole time interval with a plurality of points in time) to assess the effects of the parameter change at other points in time.

In some embodiments, the one or more computer processors may be programmed to display visual representations associated with two or more statistical models optimized for particular categorical user types and may optionally provide a likelihood or other confidence metric indicating that the user is associated with a particular user category. In one non-limiting example, the system may analyze the signals recorded by a plurality of neuromuscular sensors (e.g., EMG sensors) and categorize users based on variations in muscle activity due to a location and amount of adipose tissue in the arm. Adipose tissue affects the filtering of neuromuscular activity recorded by electromyography at the skin surface, so categorizing users according to adipose tissue may improve the quality of handstate rendering and/or detection of a particular gesture. The location and amount of adipose tissue in a user may be measured or estimated in various ways, including via ultrasonography. In another non-limiting example, variations in individual anatomy may be used to categorize users. For example, the effect of a particular muscle activation on the movement of a part of the body (e.g. the hand) depends on individual anatomy, including the size of the arm or hand and the stiffness of joints, and variations in individual anatomy that affect how joints move based on a particular muscle activation may be used to categorize users and the model parameters best suited to them.

In some embodiments, a user or third-party may select a statistical model and/or a model parameter value based on a particular task or use case. For example, statistical models used to track the position of a body part (e.g., to estimate handstate) may exhibit tradeoffs between accuracy and latency. For some applications, the system may be configured to track a body part (e.g., the hand) to reduce accuracy in order to reduce the latency of estimating position (e.g., a virtual rendering of the position of the hand or the detection of a particular gesture). In another example, statistical models used to track the position of a body part (e.g., to estimate handstate) may exhibit tradeoffs between accuracy and dimensionality. Thus, for some applications, the system may be configured to reduce the dimensionality of tracking in order to improve accuracy (e.g., to reduce the number of finger joint angles estimated).

In some cases, a user may exhibit idiosyncrasies in their performance of a particular movement, and selection of a statistical model or a model parameter may be optimized such that a particular movement (e.g., a handstate gesture) is recognized by the system with high reliability and sensitivity in order to enable effective machine control.

FIG. 5A illustrates a wearable system with sixteen neuromuscular sensors 510 (e.g., EMG sensors) arranged circumferentially around an elastic band 520 configured to be worn around a user's lower arm or wrist. As shown, EMG sensors 510 are arranged circumferentially around elastic band 520. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

In some embodiments, sensors 510 include a set of neuromuscular sensors (e.g., EMG sensors). In other embodiments, sensors 510 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 510 may be coupled together using flexible electronics 530 incorporated into the wearable device. FIG. 5B illustrates a cross-sectional view through one of the sensors 510 of the wearable device shown in FIG. 5A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 510 are discussed in more detail below in connection with FIGS. 6A and 6B FIGS. 6A and 6B illustrate a schematic diagram with internal components of a wearable system with sixteen EMG sensors, in accordance with some embodiments of the technology described herein. As shown, the wearable system includes a wearable portion 610 (FIG. 6A) and a dongle portion 620 (FIG. 6B) in communication with the wearable portion 610 (e.g., via Bluetooth or another suitable short range wireless communication technology). As shown in FIG. 6A, the wearable portion 610 includes the sensors 610, examples of which are described in connection with FIGS. 5A and 5B. The output of the sensors 510 is provided to analog front end 630 configured to perform analog processing (e.g., noise reduction, filtering, etc.) on the recorded signals. The processed analog signals are then provided to analog-to-digital converter 632, which converts the analog signals to digital signals that can be processed by one or more computer processors. An example of a computer processor that may be used in accordance with some embodiments is microcontroller (MCU) 634 illustrated in FIG. 6A. As shown. MCU 634 may also include inputs from other sensors (e.g., IMU sensor 640), and power and battery module 642. The output of the processing performed by MCU may be provided to antenna 650 for transmission to dongle portion 620 shown in FIG. 6B.

Dongle portion 620 includes antenna 652 configured to communicate with antenna 650 included as part of wearable portion 610. Communication between antenna 650 and 652 may occur using any suitable wireless technology and protocol, non-limiting examples of which include radiofrequency signaling and Bluetooth. As shown, the signals received by antenna 652 of dongle portion 620 may be provided to a host computer for further processing, display, and/or for effecting control of a particular physical or virtual object or objects.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

In addition to the description above, this disclosure includes the description in Appendices A and B attached hereto, which are incorporated by reference.

What is claimed is:

1. A method comprising:
   at an electronic device that is communicatively coupled to one or more wearable neuromuscular sensors and a user interface:
      receiving, from the one or more wearable neuromuscular sensors, a plurality of neuromuscular signals detected during performance of a gesture by a user;
      providing, as input to one or more statistical models, information associated with the plurality of neuromuscular signals;
      receiving, as one or more outputs from the one or more statistical models, pose and/or force estimates associated with a musculoskeletal representation of the user;
      providing, to the user interface, a visual representation of the musculoskeletal representation using, in part, the pose and/or force estimates;
      receiving, from the user interface, user input to adjust the visual representation to conform to the gesture;
      based on the user input, determining a tuned statistical model for the user that predicts the gesture more accurately than the one or more statistical models when using the information associated with the plurality of neuromuscular signals as input by selecting the tuned statistical model from the one or more statistical models; and
      switching one or more times between displaying the visual representation and a second candidate visual representation prior to receiving the user input.

2. The method of claim 1, wherein determining the tuned statistical model comprises determining the statistical model that resulted in the adjusted visual representation.

3. The method of claim 1, further comprising:
   receiving, from the one or more wearable neuromuscular sensors, a plurality of additional neuromuscular signals detected during performance of an additional gesture by the user;
   providing, as input to the tuned statistical model, information associated with the plurality of additional neuromuscular signals;
   receiving, as one or more outputs from the tuned statistical model, additional pose and/or force estimates associated with an additional musculoskeletal representation of the user; and
   providing, to the user interface, a visual representation of the additional musculoskeletal representation using, in part, the additional pose and/or force estimates.

4. The method of claim 1, wherein the user interface is presented on a head-mounted display of an artificial reality device.

5. The method of claim 1, further comprising prompting the user to select a choice from each of a plurality of binary choices associated with different rendered visual representations, and
   wherein receiving the user input comprises receiving input associated with the plurality of binary choices.

6. The method of claim 5, further comprising:
   aggregating the received input associated with the plurality of binary choices, and
   adjusting one or more parameters of the one or more statistical models based on the aggregated input.

7. The method of claim 1, further comprising overlaying the visual representation with a second candidate visual representation, wherein the visual representation and second visual representation are rendered using different colors.

8. The method of claim 1, further comprising displaying the visual representation and a second candidate visual representation at a same time.

9. The method of claim 1, further comprising rendering the visual representation and a second candidate visual representation side-by-side.

10. The method of claim 1, wherein the gesture comprises a continuous gesture, and providing the visual representation comprises generating at least one animation representing the gesture, wherein the at least one animation comprises the visual representation rendered at a plurality of points in time.

11. The method of claim 10, wherein receiving the user input comprises receiving the user input during replay of at least a portion of the at least one animation.

12. The method of claim 10, further comprising:
    receiving a selection of one of the plurality of points in time of the animation, and
    wherein receiving the user input comprises receiving the user input subsequent to receiving the selection of one of the plurality of points in time of the animation.

13. The method of claim 1, wherein the musculoskeletal representation is a musculoskeletal representation associated with a hand, and
    wherein the pose and/or force estimates comprise hand-state estimates.

14. The method of claim 1, wherein the user interface is a graphical user interface configured to visually instruct the user to perform the gesture.

15. The method of claim 1, further comprising displaying a likelihood or quality metric associated with the output from the one or more statistical models.

16. An electronic device comprising:
a communications interface that is in communication with
(i) one or more neuromuscular sensors configured to detect a plurality of neuromuscular signals from a user and (ii) a user interface;
a plurality of processors; and
memory storing one or more programs configured to be executed by the plurality of processors, the one or more programs including instructions for:
receiving, from the one or more neuromuscular sensors via the communications interface, a plurality of neuromuscular signals detected during performance of a gesture by a user;
providing, as input to one or more statistical models, information associated with the plurality of neuromuscular signals, wherein the one or more statistical models output pose and/or force estimates for the gesture;
providing, to the user interface via the communications interface, a visual musculoskeletal representation generated based on the pose and/or force estimates from the one or more statistical models;
receiving, from the user interface via the communications interface, user input to adjust the visual musculoskeletal representation to more closely conform to the gesture;
based on the user input, determining a tuned statistical model for the user that predicts the gesture more accurately than the one or more statistical models when using the information associated with the plurality of neuromuscular signals as input by selecting the tuned statistical model from the one or more statistical models; and
switching one or more times between displaying the visual representation and a second candidate visual representation prior to receiving the user input.

17. The electronic device of claim 16, wherein determining the tuned statistical model comprises determining the statistical model that resulted in the adjusted visual representation.

18. The electronic device of claim 16, wherein the one or more programs further include instructions for:
receiving, from the one or more neuromuscular sensors, a plurality of additional neuromuscular signals detected during performance of an additional gesture by the user;
providing, as input to the tuned statistical model, information associated with the plurality of additional neuromuscular signals;
receiving, as one or more outputs from the tuned statistical model, additional pose and/or force estimates associated with an additional musculoskeletal representation of the user; and
providing, to the user interface, a visual representation of the additional musculoskeletal representation using, in part, the additional pose and/or force estimates.

19. The electronic device of claim 16, wherein the one or more programs further include instructions for repeatedly switching between displaying the visual representation and a second candidate visual representation prior to receiving the user input.

20. The electronic device of claim 16, wherein the one or more programs further include instructions for prompting the user to select a choice from each of a plurality of binary choices associated with different rendered visual representations, and
wherein receiving the user input comprises receiving input associated with the plurality of binary choices.

21. The electronic device of claim 20, wherein the one or more programs further include instructions for:
aggregating the received input associated with the plurality of binary choices, and
adjusting one or more parameters of the one or more statistical models based on the aggregated input.

22. The electronic device of claim 16, wherein the one or more programs further include instructions for overlaying the visual representation with a second candidate visual representation, wherein the visual representation and second visual representation are rendered using different colors.

23. The electronic device of claim 16, wherein the one or more programs further include instructions for displaying the visual representation and a second candidate visual representation at a same time.

24. The electronic device of claim 16, wherein the one or more programs further include instructions for rendering the visual representation and a second candidate visual representation side-by-side.

25. The electronic device of claim 16, wherein the gesture comprises a continuous gesture, and providing the visual representation comprises generating at least one animation representing the gesture, wherein the at least one animation comprises the visual representation rendered at a plurality of points in time.

26. The electronic device of claim 25, wherein receiving the user input comprises receiving the user input during replay of at least a portion of the at least one animation.

27. The electronic device of claim 25, wherein the one or more programs further include instructions for:
receiving a selection of one of the plurality of points in time of the animation, and
wherein receiving the user input comprises receiving the user input subsequent to receiving the selection of one of the plurality of points in time of the animation.

28. The electronic device of claim 16, wherein the musculoskeletal representation is a musculoskeletal representation associated with a hand, and
wherein the pose and/or force estimates comprise hand-state estimates.

29. An artificial-reality system comprising:
a head-mounted display; and
one or more electronic devices that are in communication with the head-mounted display, the one or more electronic devices being configured to:
receive a plurality of neuromuscular signals from a user during performance of a gesture while the user is wearing a first electronic device of the one or more electronic devices, wherein the first electronic device includes one or more neuromuscular sensors configured to detect the neuromuscular signals;
provide, as input to one or more statistical models, information associated with the plurality of neuromuscular signals;
wherein the head-mounted display is configured to:
receive, as output(s) from the one or more statistical models, pose and/or force estimates associated with a musculoskeletal representation of the user;
generate a visual representation of the musculoskeletal representation using, in part, the pose and/or force estimates;
process user input, based on the generated visual representation, to adjust the generated visual representation to more closely conform to the gesture;

based on the user input, determining a tuned statistical model for the user that predicts the gesture more accurately than the one or more statistical models when using the information associated with the plurality of neuromuscular signals as input by selecting the tuned statistical model from the one or more statistical models; and switch one or more times between displaying the visual representation and a second candidate visual representation prior to receiving the user input.

30. The artificial-reality system of claim 29, wherein:
the head-mounted display comprises a user interface; and
the user input is received via the user interface.

* * * * *